United States Patent
Rönneke

(10) Patent No.: US 10,805,830 B2
(45) Date of Patent: Oct. 13, 2020

(54) SYSTEMS AND METHODS FOR REGULATING USER DATA TRAFFIC IN A WIRELESS NETWORK

(71) Applicant: Telefonaktiebolaget L M Ericsson (publ), Stockholm (SE)

(72) Inventor: Hans Bertil Rönneke, Kungsbacka (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 141 days.

(21) Appl. No.: 14/826,899

(22) Filed: Aug. 14, 2015

(65) Prior Publication Data
US 2017/0048746 A1    Feb. 16, 2017

(51) Int. Cl.
*H04W 28/02*    (2009.01)
*H04L 12/801*    (2013.01)
(Continued)

(52) U.S. Cl.
CPC ......... *H04W 28/0289* (2013.01); *H04L 47/12* (2013.01); *H04L 47/32* (2013.01);
(Continued)

(58) Field of Classification Search
CPC ... H04W 28/0289; H04W 4/005; H04W 8/18; H04W 28/0215; H04W 48/02;
(Continued)

(56) References Cited

U.S. PATENT DOCUMENTS

| | | | |
|---|---|---|---|
| 8,867,476 B2 * | 10/2014 | Jain .................. | H04B 15/00 370/254 |
| 2011/0246683 A1 | 10/2011 | Kesselman et al. | |

(Continued)

FOREIGN PATENT DOCUMENTS

| | | |
|---|---|---|
| CN | 103024008 A | 4/2013 |
| CN | 104509171 A | 4/2015 |

(Continued)

OTHER PUBLICATIONS

International Search Report and Written Opinion dated Aug. 31, 2016 in International application No. PCT/EP2016/064435, 14 pages.

(Continued)

*Primary Examiner* — Noel R Beharry
*Assistant Examiner* — Pamit Kaur
(74) *Attorney, Agent, or Firm* — Rothwell, Figg, Ernst & Manbeck, P.C.

(57) ABSTRACT

Various embodiments described herein aim to ensure that user data transmissions (e.g., small data transmissions that are sent using control plane messages) do not become excessive and stay infrequent, thereby reducing the likelihood of a network overload situation. In one embodiment, an admission control function (ACF) for regulating the transmission of uplink user data is implemented in a wireless communication device (WCD) (e.g., a CIoT device). Such a WCD device may receive from a core serving node (CSN) admittance information (AI) (e.g., parameters, such as thresholds, used by the ACF to regulate the uplink traffic) that is used in performing the admittance control.

28 Claims, 11 Drawing Sheets

(51) Int. Cl.
| | |
|---|---|
| H04W 4/70 | (2018.01) |
| H04W 60/04 | (2009.01) |
| H04W 48/08 | (2009.01) |
| H04W 48/02 | (2009.01) |
| H04W 8/18 | (2009.01) |
| H04L 12/823 | (2013.01) |

(52) U.S. Cl.
CPC ............... *H04W 4/70* (2018.02); *H04W 8/18* (2013.01); *H04W 28/0215* (2013.01); *H04W 48/02* (2013.01); *H04W 48/08* (2013.01); *H04W 60/04* (2013.01)

(58) Field of Classification Search
CPC ...... H04W 48/08; H04W 60/04; H04L 47/12; H04L 47/32
See application file for complete search history.

(56) References Cited

U.S. PATENT DOCUMENTS

| | | | | |
|---|---|---|---|---|
| 2012/0282956 | A1* | 11/2012 | Kim ....................... | H04W 4/70 455/466 |
| 2013/0100895 | A1 | 4/2013 | Aghili et al. | |
| 2013/0294271 | A1* | 11/2013 | Nagata .................. | H04W 24/10 370/252 |
| 2013/0324144 | A1* | 12/2013 | Warken ............. | H04W 72/1221 455/452.1 |
| 2014/0016614 | A1* | 1/2014 | Velev ...................... | H04W 4/70 370/331 |
| 2014/0219183 | A1* | 8/2014 | Xu .......................... | H04W 4/70 370/329 |
| 2014/0242970 | A1* | 8/2014 | Yu .......................... | H04W 8/02 455/419 |
| 2014/0307682 | A1* | 10/2014 | Xiong .................. | H04W 24/02 370/329 |
| 2014/0341058 | A1* | 11/2014 | Takano ................. | H04W 24/08 370/252 |
| 2015/0036574 | A1* | 2/2015 | Uemura ............ | H04W 52/0216 370/311 |
| 2015/0201371 | A1 | 7/2015 | Tamura et al. | |
| 2015/0215839 | A1 | 7/2015 | Johansson et al. | |
| 2015/0282175 | A1* | 10/2015 | Dai ....................... | H04W 28/02 370/329 |
| 2015/0312942 | A1 | 10/2015 | Cui et al. | |
| 2016/0014037 | A1 | 1/2016 | Hu et al. | |

FOREIGN PATENT DOCUMENTS

| | | |
|---|---|---|
| EP | 2 369 883 A1 | 9/2011 |
| EP | 2509345 A1 | 10/2012 |
| EP | 2 568 758 A1 | 3/2013 |
| EP | 2 911 443 A1 | 8/2015 |
| JP | 2013-529402 A | 7/2013 |
| JP | 2015-530838 A | 10/2015 |
| WO | 2012/136291 A2 | 10/2012 |
| WO | 2015056447 A1 | 4/2015 |

OTHER PUBLICATIONS

Ericsson: "Small Data overload control", 3GPP Draft; S2-15923_WAS2740-CIOT-SMALL_DATA_OVERLOAD_CONTROL_V2, 3rd Generation Partnrship Project (3GPP), Mobile Competence Centre; 650, Route Des Lucioles; F-06921; Sophia-Antipolis Cedex; France; vol. SA WG2, No. Sophia Antipolis, France; Aug. 31, 2015-Sep. 3, 2015; Sep. 3, 2015 (Sep. 3, 2015), XP051034623, 5 pages.
"3rd Generation Partnership Project; Technical Specification Group Services and System Aspects; Study on Machine-Type Communications (MTC) and other mobile data applications communications enhancements (Release 12)", 3GPP TR 23.887 V12.0.0 (Dec. 2013), 151 pages.
"3rd Generation Partnership Project; Technical Specification Group GSM/EDGE Radio Access Network; Cellular System Support for Ultra Low Complexity and Low Throughput Internet of Things; (Release 13)", 3GPP TR 45.820 V1.3.1 (Jun. 2015), 271 pages.
"3rd Generation Partnership Project; Technical Specification Group Services and System Aspects; Architecture enhancements for Cellular Internet of Things; (Release 13)", 3GPP TR 23.720 V0.0.0 (Jul. 2015), 55 pages.
International Search Report and Written Opinion issued in corresponding International Application No. PCT/EP2016/076290 dated Feb. 17, 2017, 12 pages.
Hitachi, "Online Small Data Transfer using NAS", SA WG2 Meeting #86, S2-113043, Jul. 11-15, 2011, 5 pages.
3GPP 3rd Generation Partnership Project: "Technical Specification Group Services and System Aspects; Architecture enhancements for Cellular Internet of Things (Release 13)", 3GPP TR 23.720 V1.2.0, Nov. 2015(Nov. 2015), the whole document, 96 pages.
3GPP 3rd Generation Partnership Project: "Technical Specification Group GSM/EDGE Radio Access Network; Cellular system support for ultra-low complexity and low throughput Internet of Things (CIoT) (Release 13)", 3GPP TR 45.820 V13.1.0, Nov. 2015(Nov. 2015), the whole document, 495 pages.
3GPP 3rd Generation Partnership Project: "Technical Specification Group Services and System Aspects; General Packet Radio Service (GPRS) enhancements for Evolved Universal Terrestrial Radio Access Network (E-UTRAN) access (Release 13)", 3GPP TS 23.401 V13.5.0, Dec. 2015(Dec. 2015), the whole document, 337 pages.
3GPP 3rd Generation Partnership Project: "Technical Specification Group Services and System Aspects; Architecture enhancements to facilitate communications with packet data networks and applications (Release 13)", 3GPP TS 23.682 V13.4.0, Dec. 2015(Dec. 2015), the whole document, 81 pages.
3GPP 3rd Generation Partnership Project: "Technical Specification Group Radio Access Network; Evolved Universal Terrestrial Radio Access (E-UTRA); Radio Resource Control (RRC); Protocol specification (Release 13)", 3GPP TS 36.331 V13.0.0, Dec. 2015(Dec. 2015), the whole document, 507 pages.
3GPP 3rd Generation Partnership Project: "Technical Specification Group Services and System Aspects;Service accessibility (Release 13)", 3GPP TS 22.011 V13.4.0, Dec. 2015(Dec. 2015), the whole document, 28 pages.
3GPP 3rd Generation Partnership Project: "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.2.0, Dec. 2015(Dec. 2015), the whole document, 290 pages.
3GPP 3rd Generation Partnership Project: "Technical Specification Group Radio Access Network; Evolved Universal Terrestrial Radio Access Network (E-UTRAN); S1 Application Protocol (S1AP) (Release 13)", 3GPP TS 36.413 V13.1.0, Dec. 2015(Dec. 2015), the whole document, 314 pages.
Non-Final Office Action dated May 18, 2018 issued in U.S. Appl. No. 15/319,842. (11 pages).
3GPP SA WG2 Meeting #116BIS; S2-165431; (Aug. 29-Sep. 2, 2016), Sanya, P.R. China. (1 page).
3GPP SA WG2 Meeting #116BIS; S2-165232; (Aug. 29-Sep. 2, 2016), Sanya, P.R. China. (5 pages).
3GPP SA WG2 Meeting #115; S2-162868; (May 23-27, 2016), Nanjing, P.R. China. (14 pages).
3GPP TSG-SA WG2 Meeting #112; S2-154024; (Nov. 16-20, 2015), Anaheim, CA USA. (9 pages).
3GPP TSG SA WG2 Meeting #113; S2-160403; (Jan. 25-30, 2016), Frigate Bay, St. Kitts. (12 pages).
Final Office Action issued in U.S. Appl. No. 15/319,842 dated Jul. 25, 2019, (12 pages).
Japanese Office Action with English Translation issued in corresponding Japanese Application No. 2018-539967, dated Jul. 8, 2019, (10 pages).
English Translation of Japanese Search Report issued in corresponding Japanese Application No. 2018-539967, dated Jun. 25, 2019, (32 pages).

(56) References Cited

OTHER PUBLICATIONS

Huawei, "Data over NAS for infrequent small data transmission", SA WG2 Meeting #110, S2-152340, Dubrovnik, Croatia Jul. 6-10, 2015, (6 pages).
Alcatel-Lucent, et al., "Introduction of Control Plane CIoT EPS optimization", 3GPP TSG SA WG2 Meeting #112, S2-154451, Anaheim, USA, Nov. 16-20, 2015, (11 pages).
Non-Final Office Action issued in U.S. Appl. No. 15/319,842 dated Apr. 18, 2019, 17 pages.

* cited by examiner

SYSTEMS AND METHODS FOR REGULATING USER DATA TRAFFIC IN A WIRELESS NETWORK

TECHNICAL FIELD

Aspects of this disclosure relate to regulating user data traffic in a wireless network.

BACKGROUND

Wireless communication devices (WCDs) (e.g., smartphones, tablets, phablets, personal computers, cellular Internet-of-Things (CIoT) devices, machine-to-machine devices, etc.) can be used to wirelessly transmit user data (a.k.a., "application data") to a receiving communication device (e.g., a server computer, such as an application server) via a wireless network (e.g., a 4G cellular network). Within the 3GPP system, user data is distinguishable from control plane data, which is data that is destined for a control plane protocol layer, such as, for example the Non-Access Stratum (NAS) protocol layer.

It is expected that in the near future many things (e.g., household appliances, meters, vending machines, cars, buildings, etc.) will include WCDs—i.e., the things will be given the capability to wirelessly transmit data via a wireless network (e.g., a 3GPP 4G cellular network). Such things that have WCD capability are sometimes referred to as "cellular Internet-of-Things (CIoT)" devices or "machine type communication (MTC)" devices.

It is expected that when CIoT devices have user data (as opposed to control plane data) to send to another device (e.g., an application server), the amount of the user data will tend to be small. It is also expected that the number of CIoT devices in use will dramatically increase in the near future. Thus, even if the CIoT devices only send small amounts of user data, the total amount of user data sent by all of the CIoT devices in a given area (or the total number of messages sent by such devices) could overwhelm the radio access network that serves that given area. The signaling generated at each data transmission occasion could also overwhelm in the radio access network and the core network.

Accordingly, what is desired are systems and methods for regulating the transmission of user data traffic in a wireless network.

SUMMARY

Some CIoTs are configured to send small amounts of user data by including the user data in control plane messages (e.g., Non-Access Stratum (NAS) messages) or as part of control plane resources (e.g. radio resource control (RRC) signaling and S1-AP signaling), as opposed to using user plane resources (e.g., data radio bearers (DRBs) and the S1-U interface) to send the user data. Such CIoT devices can potentially overload a network (e.g., overload a base station of a radio access network or overload a node in the core network) if the CIoT devices are not limited in how much or how often they send user data in this way.

The $3^{rd}$ Generation Partnership Project (3GPP) has specified mechanisms to handle situations in which a network overload has already happened (e.g. back-off mechanisms), but the 3GPP has not specified mechanisms to prevent overloads from happening in the first place.

One technique that can be used to prevent overloads from happening is often referred to as "admission control."

Admission control is frequently used to regulate user data in Internet Protocol (IP) networks. To date, there has been no reason to use admission control in the control plane. This disclosure proposes to introduce an admission control mechanism that can be used for "small data" (i.e., a set of data that is not more than 200 bytes) in the control plane (the mechanism, however, is also applicable for user plane based small data solutions and non-small data environments).

Described herein are various embodiments that aim to ensure that user data transmissions (e.g., small data transmissions that are sent using control plane messages) do not become excessive and stay infrequent, thereby reducing the likelihood of a network overload situation.

For example, in one embodiment, an admission control function (ACF) for regulating the transmission of uplink user data is implemented in the WCDs (e.g., CIoT devices) themselves. Such a WCD device may receive admittance information (e.g., parameters, such as thresholds, used by the ACF to regulate the uplink traffic) from a core serving node (CSN) (i.e., an apparatus in a network that provides network services to the WCD, such as, for example, an apparatus that implements a Mobility Management Entity (MME), a serving GPRS support node (SGSN), a CIoT Serving Gateway Node (C-SGN)—a C-SGN is a newly proposed logical entity that supports only the necessary functionality required for CIoT use cases). Additionally (or in the alternative) a network based ACF is implemented in the CSN. The network based ACF controls downlink and/or uplink user data. It is expected that an ACF being mandatory for WCDs is subject to a mobile terminal conformance testing and approval process before being allowed to operate in 3GPP cellular networks.

In some embodiments, there are two alternative ways to handle a WCD that transmits uplink user data more often than desired: deny transmission or generate a charging event when an admission threshold is exceeded. Denying a transmission when an admission threshold has been passed may be particularly useful for ultra-low complexity devices and low end subscription plans e.g. a fixed cost for the lifetime of the device/subscription or a fixed cost for a certain time period (e.g. one year). On the other hand, generating specific charging event allows the operator to charge extra when an admission threshold has been exceeded.

Advantages

An advantage of embodiments described herein is that they reduce the likelihood a 3GPP wireless network is overloaded by CIoT devices sending small data. Also, the embodiments can be used in combination with other solutions for small data transmissions (see e.g., 3GPP TR 23.720 Rel-14 v 0.1.0 and 3GPP TR 23.887 Rel-12 v12.0.0). Embodiments also provide a solution where a network operator can configure different subscription plans for different CIoT devices based on number of small data transmissions or packets per time unit, data size, inter-arrival time and similar. Embodiments enable subscription plans for CIoT devices with reduced costs for charging. One subscription plan could for example be 10 small data transmissions per day for 5 years. After that the subscription cannot be renewed but has to be discarded. This would allow a minimum of administrative costs for the operator e.g. monthly bills may not be needed. Another advantage of embodiments is that they enforce the limits of the subscription plans for CIoT devices without any waste of radio resources. That is, blocking of uplink data is done at the source in the CIoT device before using any radio resources.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
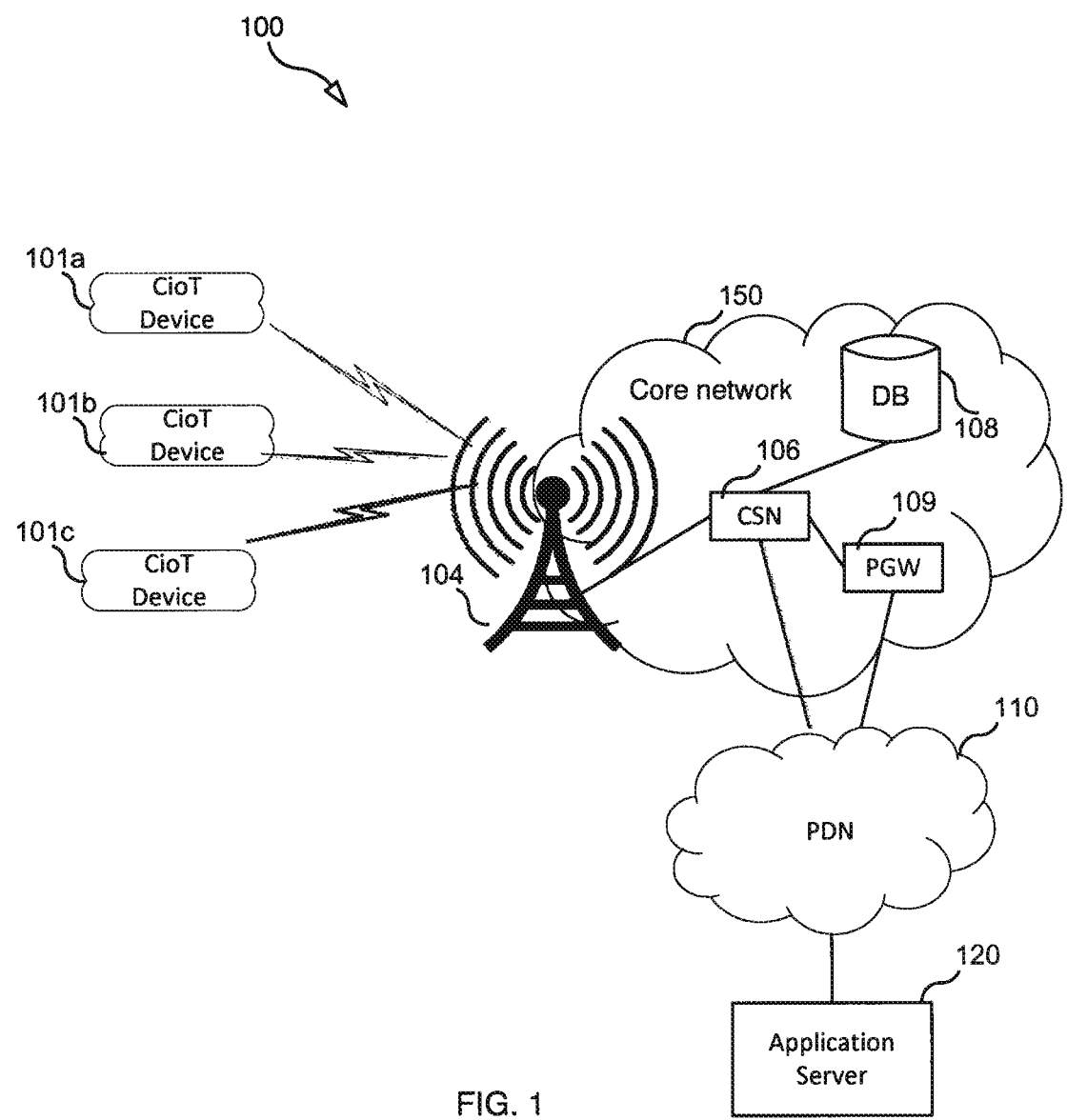
FIG. 1 illustrates a wireless communication system according to some embodiments.

FIG. 1 illustrates a wireless communication system 100 according to some embodiments. As shown in FIG. 1, system 100 may include a group of WCDs. In the example shown, the group WCDs consists of CIoT device 101a, CIoT device 101b, CIoT device 101c, each of which is capable of transmitting uplink user data to a node 104 of a radio access network (RAN) (i.e., node 104 is a "RAN node"). Node 104 may be a base station, such as, for example, an evolved NodeB (eNB) or a CIoT base station (C-BS), which is a base station designed to serve only CIoT devices. Node 104 (a.k.a., BS 104) communicates (directly or indirectly) with a core serving node (CSN) 106, which is connected to a packet data network (PDN) (e.g., the Internet) 110, either directly or indirectly (e.g., indirectly via a PDN gateway (PGW) 109). An application server 120 may also be connected to network 110. BS 104 and CSN 106 enable the CIoT devices 101 to transmit data to and receive data from application server 120. For example, CIoT devices 101 may be meters that monitor energy consumption and application server 120 may be a data collection server for collecting the energy consumption information generated by CIoT devices 101.

As discussed above, there is proposal to allow WCDs (e.g., CIoT devices) to transmit a small amount of uplink user data by including such small user data in a control plane message and transmitting the control plane message to a core network node via a radio access network (RAN), in which the core network node will extract the user data from the control plane message and forward it a node in a PDN (e.g., an application server connected to the Internet). Accordingly, when a CIoT device 101 has user data (e.g., energy consumption data) to report to application server 120, the CIoT device 101 may be configured to transmit the data using control plane signaling. Such a technique can lead to efficient use of the radio interface between the CIoT device 101 and the BS 104. However, as such data transmissions become more frequent and packets become larger there is an inflection point where using the control plane signaling for passing user data becomes inefficient from a network resource point of view compared to using a data radio bearer (DRB) to transmit the user data. It is desirable that this inflection point is not reached. Described herein are embodiments for reducing the likelihood of reaching this inflection point. The embodiments provide a mechanism to ensure that small data transmissions do not become excessive and stay infrequent.

In one embodiment, an admission control function (ACF) for regulating the transmission of uplink user data is implemented in the WCDs themselves. Such a WCD device may obtain (e.g., receive from the CSN or retrieve from local configuration in the WCD, or from the UICC) admittance information (AI) indicating (expressly or implicitly) at least one condition under which the WCD is admitted to transmit user data to a radio access network (RAN) node (e.g., information identifying a threshold to regulate the uplink traffic or information for implementing a token bucket algorithm, such as, for example, information identifying the rate of which tokens should be added to the bucket and the maximum bucket size). Additionally (or in the alternative) a network based ACF is implemented in the CSN. The network based ACF controls downlink and/or uplink user data. The network may need to perform admission control on uplink transmissions from a WCD because there may be cases where a WCD that should itself perform access control does not do so. Such "non-conformant" WCDs shall not have an advantage compared to conformant WCDs. In some embodiments, there are two alternative ways to handle a WCD that transmits (or attempts to transmit) uplink user data more often than desired: deny the transmission or generate a charging event when an admission threshold is exceeded.

Denying a transmission when an admission threshold has been passed may be particularly useful for ultra-low complexity devices and low end subscription plans e.g. a fixed cost for the lifetime of the device/subscription or a fixed cost for a certain time period (e.g. one year). In some embodiment, the charging functions can basically be simplified or completely replaced by admission control for such subscriptions/devices. "Simplified" in the sense that traditional billing based on the amount of data would not be needed. The "simplification" aspect may be important since the average revenue per device (ARPD) would typically be small for CIoT devices, hence the costs for administrating such devices should be kept to a minimum. Fixed life time cost of the CIoT device or fixed cost for a certain time period e.g. one year are examples of what would be much easier to offer for the operator. On the other hand, in some other embodiments, for devices not being at the most extreme low end and where some sort of billing is used, generating specific charging event can allow the operator to charge extra when an admission threshold has been exceeded. In such a case, the generating of specific charging events is used (instead of discarding out of profile traffic) when excessive traffic has occurred and been registered by the network, which will allow the operator to charge extra for these events.

The decision whether to discard or generate charging event is preferably WCD/subscriber specific (i.e. for some low end subscribers excessive data are discarded and other subscribers can based on subscription plan or service level agreement be continued to be served at a higher charge).

In some embodiments, a new subscription parameter from a Home Subscriber Server (HSS) to the CSN can be used to decide if discarding or charging event applies for a specific WCD. Such an indication can also be conveyed from an machine-to-machine (M2M) service provider to the network operator by other means e.g. as a parameter in a Service Level Agreement (SLA). It may also be conveyed as a parameter in service exposure signaling from an Application Server via a Service Capability Exposure Function (SCEF) to the HSS subscription profile or the CSN.

When the CSN has received the parameter it will be stored in the CSN (e.g., in a data storage system 1012 of the CSN) and used by the ACF implemented in the CSN. The parameter may also be included in admittance information (AI) passed to a WCD device. The ACF in the WCD may then use this information for more advanced uplink admission control (e.g. only convey a certain number of out of admission profile small data messages, only convey specific categories of small data messages when out of profile etc.).

In some embodiments, instead of blocking a WCD from transmitting control plane signaling containing uplink user data because an uplink user data threshold has been reached, the WCD can be configured to attempt to transmit user data using non-control plane signaling (e.g., using a data radio bearer and S1-U).

In some environments, it is primarily the total number of small data transmission within a certain period of time and not the total amount of data transmitted in that period of time that causes high control plane system load. Accordingly, in some embodiments, the ACF has a focus on controlling the total number of small data transmissions within some given period of time. In other environments, however, it is primarily the total amount of data transmitted in a given period of time that causes high control plane system load. Thus, in other embodiments, the ACF has a focus on regulating the amount of data transmitted (e.g., the amount of data conveyed at each occasion and/or totally over a time period).

Provision of Admittance Information

In some embodiments, the network operator shall be able use different subscription plans and flexible setting of the admittance information (AI). In some embodiments, AI for a WCD (or a group of WCDs) is stored in a data base 108 (e.g., a Home Subscriber Server (HSS), as shown in FIG. 1) or in a data base for Service Level Agreements (SLA). The AI may include, for example, a threshold value representing a maximum number of small data transmissions or packets or messages per unit of time (e.g., day or hour), a maximum data size, an inter-arrival time, etc.

Admission for downlink is checked in the network e.g. MME, C-SGN, or PGW and admission for uplink in both the WCD and in the network e.g. MME, C-SGN, or PGW. The WCD shall check uplink admission to avoid that radio resources become overloaded. The network also needs to check uplink admission if a WCD for some reason does not police itself (i.e., is "non-conformant"). Non-conformant terminal implementations shall not have an advantage compared to conformant terminals.

In some embodiments, the AI is sent to the WCD by the network. The AI may, for example, be passed in an Attach Accept message, in a TAU Accept message, in a Session Creation (create PDN connection) accept/response message, as a PCO parameter, or in other NAS message.

Figure 2:
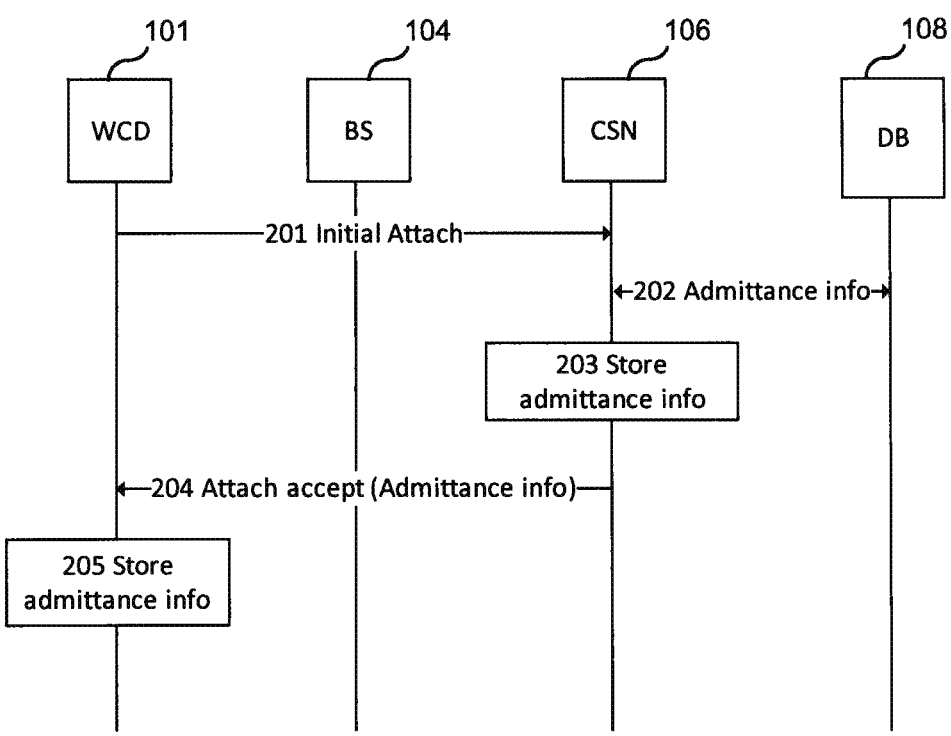
FIG. 2 is a message flow diagram illustrating a process according to some embodiments.

Referring now to FIG. 2, FIG. 2 is a message flow diagram illustrating a process according to some embodiments for provisioning AI to a CSN (e.g., MME, C-SGN, gateway, etc.) and a WCD. As shown in FIG. 2:

In step 201, WCD makes an initial attach to the network (e.g., the WCD transmits an initial NAS message, such as, for example, an Attach Request).

In step 202, the CSN obtains admittance information. For example, as shown in FIG. 2, the CSN may retrieve the admittance information from a database within the network. For instance, in step 202, in response to receiving an initial NAS message (e.g., Attach Request) transmitted by the WCD, the CSN may send to the DB 108 a data query including an identifier for identifying the WCD, which DB, in response to the query, transmits to the CSN subscription information associated with the identified WCD, which subscription information includes admittance information associated with the WCD.

In step 203, the CSN stores the admittance information locally (e.g. it may be stored in a Mobility Management (MM) context that is stored in a data storage system 1012 of the CSN or it may be stored only temporarily). In addition, the CSN also stores status information (e.g., counters, timers, etc.) associated with the WCD (or a group of WCDs), which status information is used to perform the downlink (DL) and uplink (UL) admission control with respect to data transmitted by the WCD (or by a WCD included in the group of WCDs). In one embodiment, the AI can also be provided to the PGW, e.g. as part of the Create Session signaling, and stored and used for admission control in the PGW, particularly admission control of downlink data.

In step 204, the CSN conveys the admittance information (AI) to the WCD. This may be done as part of Attach Accept, TAU Accept, Default connectivity response, other session creation signaling, or as part of other NAS message to the WCD. When the AI has changed (e.g., the DB or CSN have been updated with new AI) a GUTI Reallocation message may for example also convey the admittance information.

In step 205, the WCD receives the message containing the AI and stores the AI locally. In addition the WCD also maintains locally status information (e.g., counters, timers etc.) needed to perform the UL admission control. In other embodiments, the AI is pre-configured in the universal subscriber identity module (USIM) or Universal Integrated Circuit Card (UICC) of the WCD by the operator of the WCD.

UL Admission Control

As described above, in some embodiments, the WCD 101 shall perform admission control before transmitting any small user data (i.e., a set of user data that is not more than 200 bytes) to the BS 104. For example, in some embodiments, the admission control is performed by the WCD before any radio resource control (RRC) signaling is performed to minimize the load on radio resources. The admission control shall be performed based at least on the status information available in the WCD. Conformance tests shall be able to verify if a CIoT device support the small data admission control.

Figure 3:
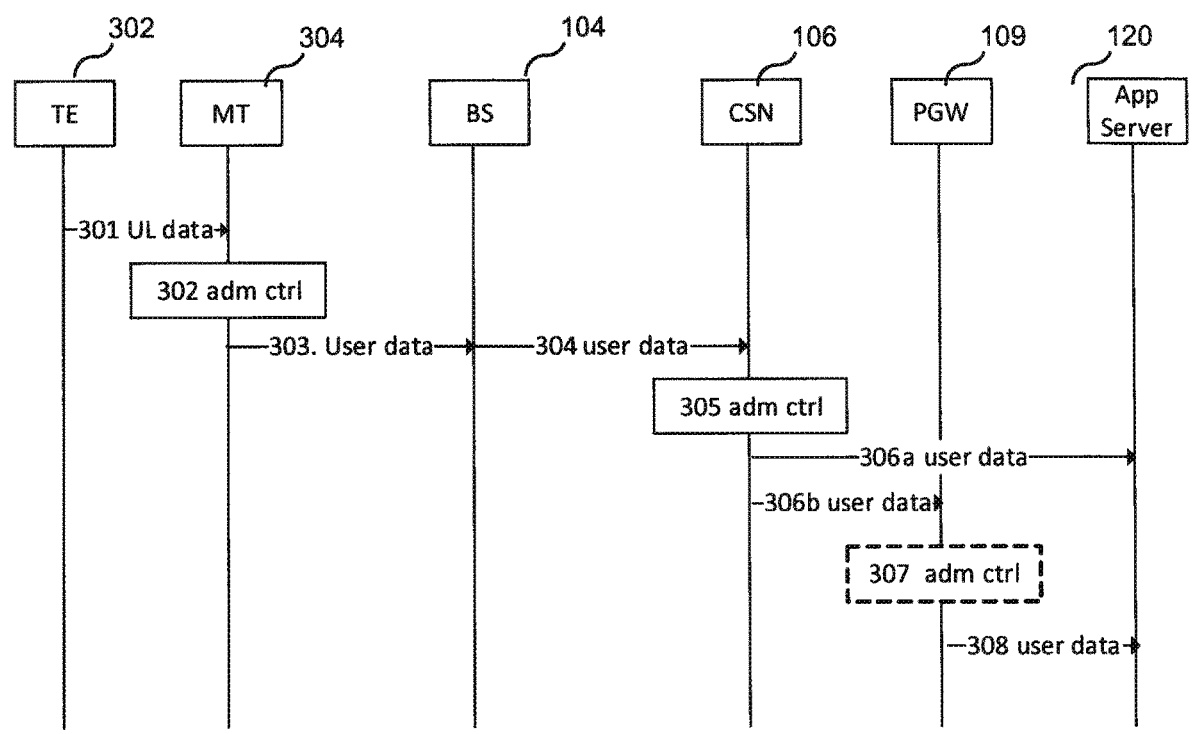
FIG. 3 is a message flow diagram illustrating a process according to some embodiments.

Referring now to FIG. 3, FIG. 3 is a message flow diagram illustrating an UL admission control process. As shown in FIG. 3:

In step 301, a terminal equipment (TE) component of the WCD provides UL user data (e.g., small user data) to a Mobile Terminal (MT) component of the WCD (e.g. over a standardized internal API, see e.g., TS 3GPP TS 27.007, or over other implementation specific internal API or interface within or with the WCD).

In step 302, the MT performs admission control based status information (counters, timers) available in the WCD. If the UL user data is not admitted, the MT shall reject the UL user data transmission request or discard the user data depending on device implementation or attempt to transmit the data at a later time. For example, in some embodiments, the MT performs admission control using a conventional token bucket algorithm. In such embodiments, the status information may include a data transmission value (V) (a.k.a., "bucket value") (e.g., a counter) that identifies the number of logical "tokens" that are currently in a logical "bucket" and, if V is equal to zero, then the UL user data is not admitted (i.e., the MT may transmit the UL data), otherwise the UL data is admitted (i.e., the MT may transmit the UL data). In such embodiments, the AI may specify that the MT should initially set V at 0 or 1 and then periodically increase V by a set amount (e.g., increase V by 1 every hour) unless V has reached a threshold value (maximum bucket size) (e.g. 10), in which case the MT should cease incrementing V. That is, the AI may specify the rate at which tokens are added to the bucket (e.g., one token per hour) and the maximum bucket size (e.g., 10 tokens). In some embodiments, MT should decrement V each time it transmits user data (or a particular type of user data, such as small data). MT may decrement V by 1 for each message that it sends or it may decrement V based on the size of the message. The amount by which MT decrements V may also be specified in the AI.

In step 303, after successful admission control the MT sends the UL user data to the BS.

In step 304, the BS forwards the UL user data to the CSN.

In step 305, the CSN performs admission control based status information (counters, timers) available in the CN node. In some embodiments, if the UL data is not admitted, the UL data is discarded. Further small user data transmission may be aborted as (e.g. the WCD is moved to idle, and BS informed with appropriate cause code, RRC connection released). Like the WCD, the CSN may perform admittance control using a toke bucket scheme.

In step 306a, after successful admission control the CSN forwards the UL user data to the receiving application server. Step 306a is performed if CSN includes a PGW that can be used to forward the user data to a node in the PDN (e.g., the application server) or the WCD is a non-roaming WCD.

In step 306b, after successful admission control the CSN sends the UL use data to the PGW. Step 306b is performed if CSN does not include a PGW or if a separate PGW must be used for the WCD (such as in a roaming situation).

In step 307, the PGW may be deployed to perform user data admission control.

In step 308, the PGW forwards the UL user data to the application server.

DL Admission Control

Figure 4:
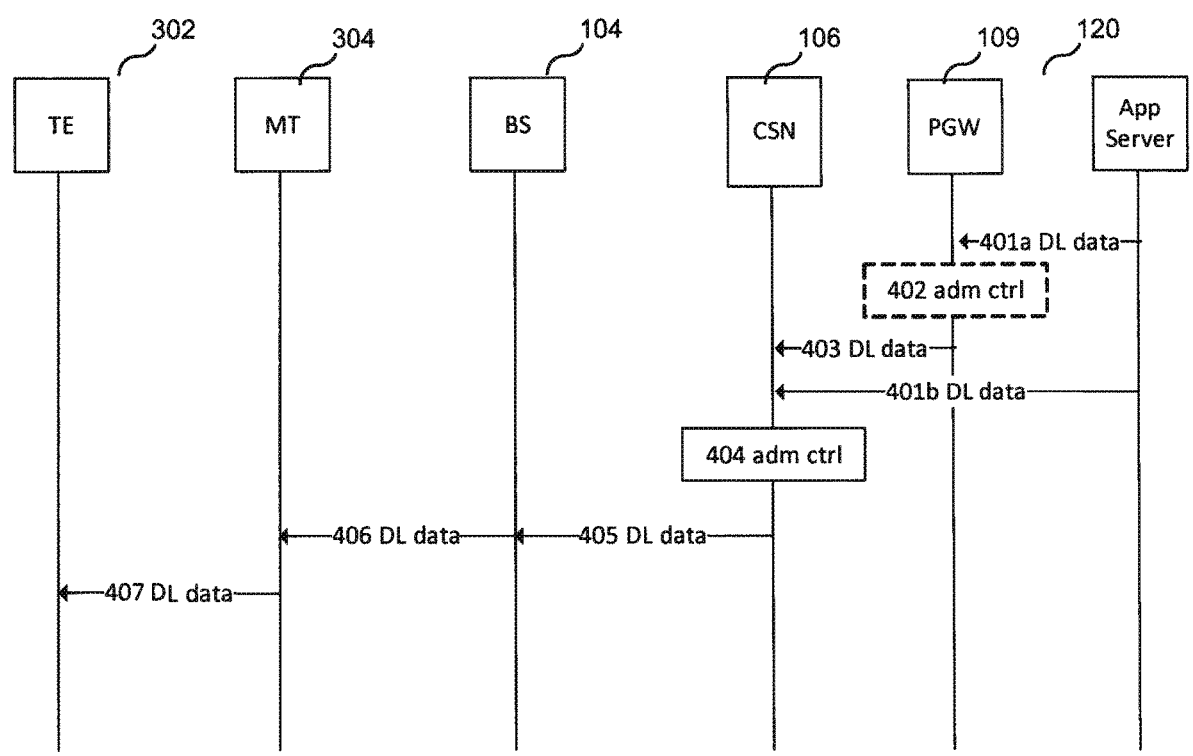
FIG. 4 is a message flow diagram illustrating a process according to some embodiments.

Referring now to FIG. 4, FIG. 4 is a message flow diagram illustrating a DL admission control process. As shown in FIG. 4:

In step 401a, the application server sends DL data (e.g., DL small data) to the PGW for a WCD that uses small data. Step 401a may be performed if the CSN does not include a PGW or if a PGW is used in a roaming case or if the application server is unable to communicate directly with the CSN.

In step 401b, the application server sends the DL data to the CSN. Step 401b is performed if the CSN includes a PGW and the application server can communicate directly with the CSN (e.g. in a non-roaming situation).

In step 402, optionally the PGW may be deployed to perform small data admission control. In such a case the PGW may perform admission control for DL data (and optionally for both DL data and UL data depending on configuration). The admission control in the PGW is based on AI and status information (counters, timers) available in the PGW.

In step 403, the PGW forwards the DL data to the CSN.

In step 404, the CSN performs admission control based on AI and status information (counters, timers) available in the CN node. If the DL data is not admitted, the DL data may be discarded. Further small data transmission shall be aborted as appropriate (depending on solution) e.g. no paging of the WCD done.

In step 405, after successful admission control the CSN conveys the DL data towards the WCD.

In step 406, the BS receives the DL data transmitted by the CSN and forwards the DL data to the WCD.

In step 407, the MT sends the DL data to the TE or over other implementation specific internal API or interface to a receiver within the WCD or to a receiver outside the MT or WCD.

Figure 5:
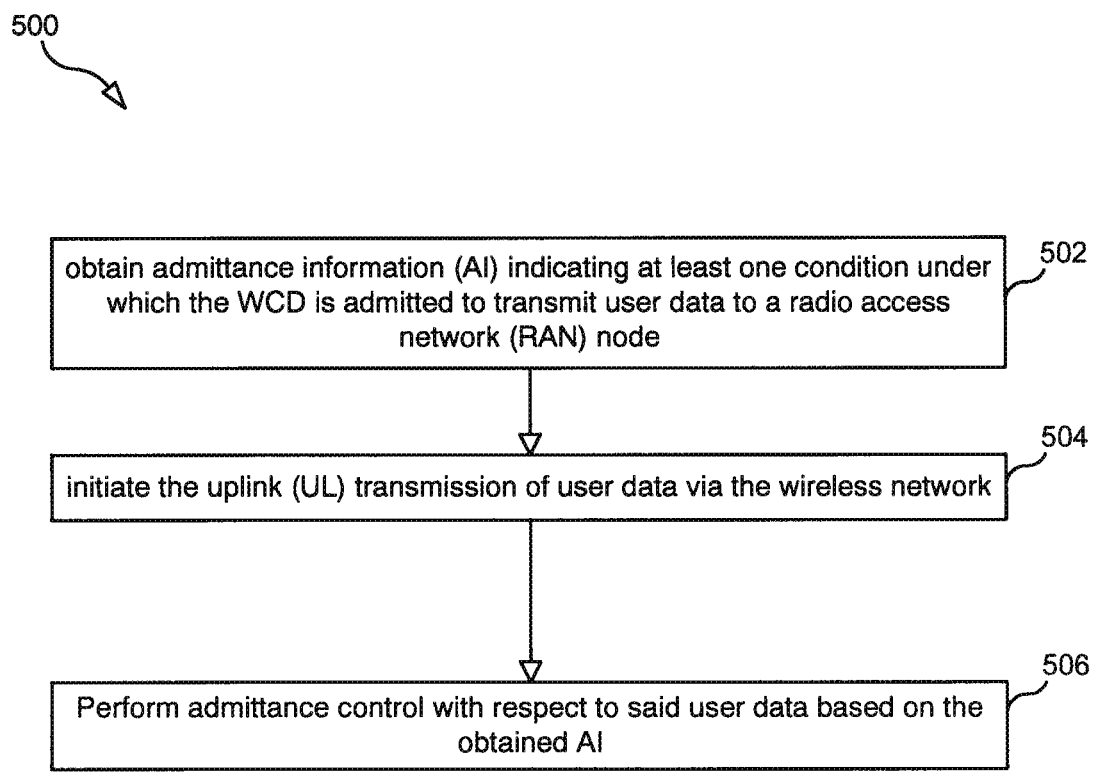
FIG. 5 is a flow chart illustrating a process according to some embodiments.

FIG. 5 is a flow chart illustrating a process 500, according to some embodiments, that is performed by the WCD.

In step 502, the WCD obtains admittance information (AI) indicating at least one condition under which the WCD is admitted to transmit user data to a radio access network (RAN) node. For example, the AI may indicate that the WCD is admitted to transmit the user data only when a "bucket" includes at least one "token." That is, for example, the AI may specify a rate at which tokens are added to the bucket and the maximum bucket size. In some other embodiments, the AI comprises information identifying (expressly or implicitly) a threshold value (T).

In step 504, the WCD initiates the uplink (UL) transmission of user data via the wireless network. For example, in step 504, the WCD stores the user data in a transmit buffer.

In step 506, the WCD performs admittance control with respect to the user data based on the obtained AI. For example, in step 506, the WCD uses the AI (or a bucket defined by the AI) to determine whether the WCD may at this time transmit the user data to the BS.

In some embodiments, performing the admittance control includes the WCD using the status information maintained by the WCD (e.g., information relating to previously transmitted user data, such as, the above mentioned data transmission value (V)) to determine whether the WCD may at this time transmit the user data to the RAN node. In some embodiments, in response to determining that the WCD may not at this time transmit the user data to the RAN node, the WCD i) discards the user data or ii) transmits the user data at a later point in time.

In some embodiments, prior to performing step 506, the WCD determines whether the user data qualifies as small data and performs step 506 only if the user data is small data, otherwise the WCD transmits the user data using, for example, a DRB.

Figure 6:
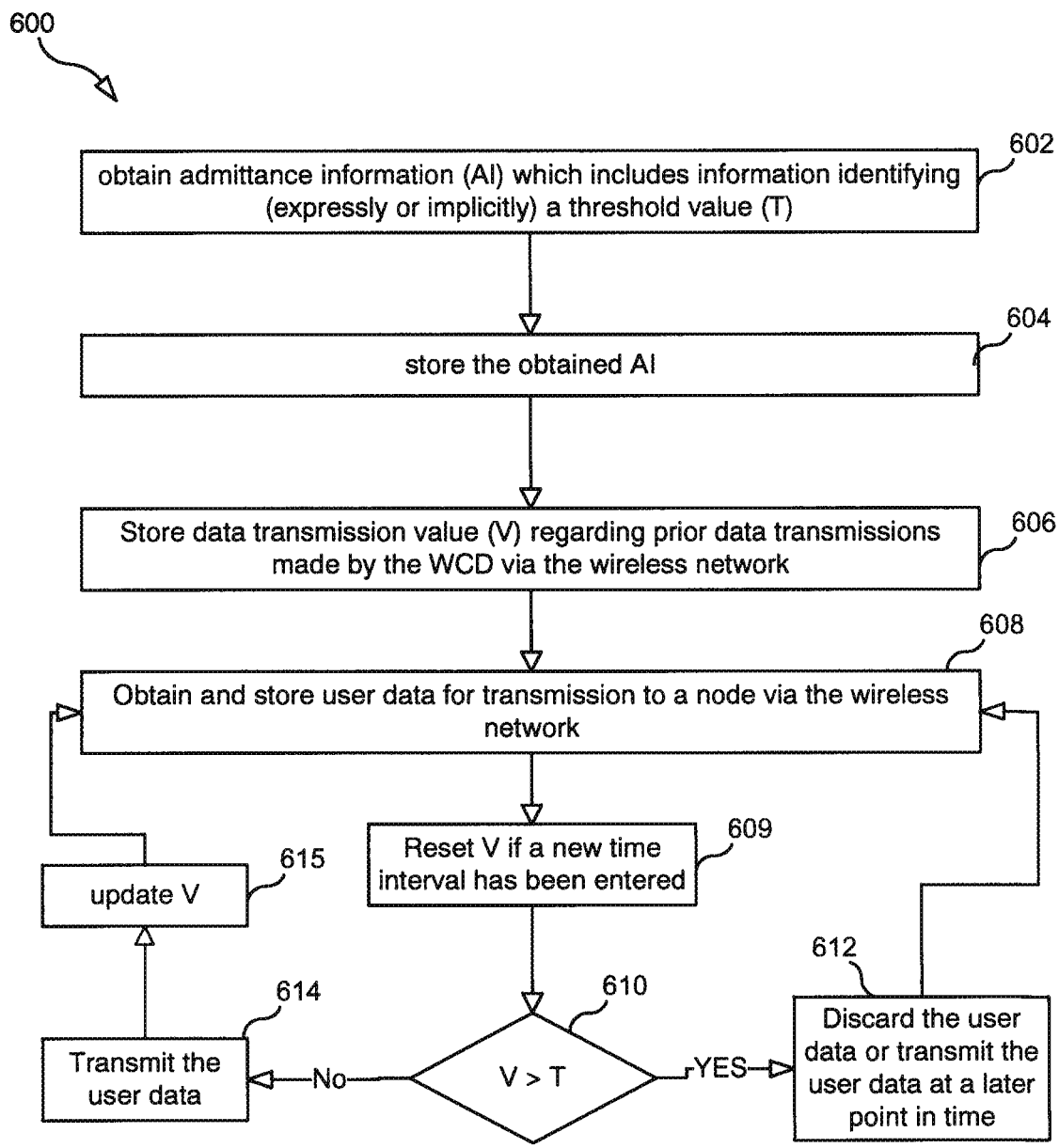
FIG. 6 is a flow chart illustrating a process according to some embodiments.

FIG. 6 is a flow chart illustrating a process 600, according to some embodiments, that is performed by the WCD.

In step 602, the WCD obtains admittance information (AI) which includes information identifying (expressly or implicitly) a threshold value (T), which could be a maximum bucket size value or other threshold.

In step 604, the WCD stores the obtained AI (e.g., the WCD stores the AI in a data storage system 1112 within the WCD).

In step 606, the WCD stores status information comprising a data transmission value (V) regarding prior data transmissions made by the WCD via the wireless network (e.g., the WCD stores the status information in data storage system 1112). In some embodiments, V corresponds to at least one of: i) a number of wireless data transmissions made by the WCD, ii) an amount of data transmitted wirelessly by the WCD, or iii) a number of logical tokens within a logical bucket. For example, in some embodiments, the V corresponds to a number of packets transmitted wirelessly by the WCD. In other embodiments, V corresponds to a number of small data messages transmitted wirelessly by the WCD (e.g. V identifies the number of small data messages that the WCD wirelessly transmitted within the last unit of time (e.g., day, hour, etc.), or ongoing time interval (e.g. day, hour etc.). In other embodiments, as discussed above, V may be a token counter for a token bucket scheme (i.e., V identifies the number of tokens in the bucket).

In step 608, the WCD obtains and stores user data for transmission to a node via the wireless network.

In step 609, the WCD resets V if a new time interval has been entered (e.g., the WCD sets V=0). As one example, the WCD may reset V a certain amount of time (e.g., 1 hour) after the most recent transmission of user data. In this way, for example, the WCD can ensure that user data is transmitted only once per the time interval (e.g., once per hour). In an alternative implementation, the control of the V value may be based on a token bucket algorithm.

In step 610, the WCD compares V against T. For example, as shown in step 610 the WCD determines whether V>T. If V is greater than T, the process proceeds to step 612, otherwise it proceeds to step 614. The V>T comparison can be made in different ways, e.g. before increase of V for the current transmission has been made, or after an increase has been made as described in step 615. That is, in some embodiments, step 615 is performed prior to step 610. In a token bucket algorithm, T may be zero (0) and in step 610 the WCD may determine whether V=T, and, if it does, then proceeds to step 612, otherwise proceed to step 614.

In step 612, the WCD discards the user data or transmits the user data at a later point in time. In some embodiments, the step of transmitting the user data at a later point in time comprises one of: a) waiting at least a certain amount of time, and then, after the amount of time has elapsed, retrying to transmit the user data, b) waiting at least until the data transmission value (V) has been reset (e.g., zeroed) and then transmitting the user data, or c) using a DRB to transmit the user data together with other user data that was previously buffered for uplink transmission.

In step 614, the WCD transmits the user data and in step 615 the WCD updates V. In some embodiments, the WCD updates V by increasing V by an amount (in other embodiments it decreases V by the amount). In some embodiments the amount is 1 (e.g., V=V+1). In some embodiments, transmitting the user data consists of transmitting N number of packets or N number of data octets or N number of small data messages, and the amount by which V is increased/decreased is equal to N (e.g., V=V+N). In some embodiments, transmitting the user data via the wireless network comprises the WCD transmitting to the CSN via the BS a control plane message (e.g., a NAS message) comprising at least a portion of the user data.

Figure 7:
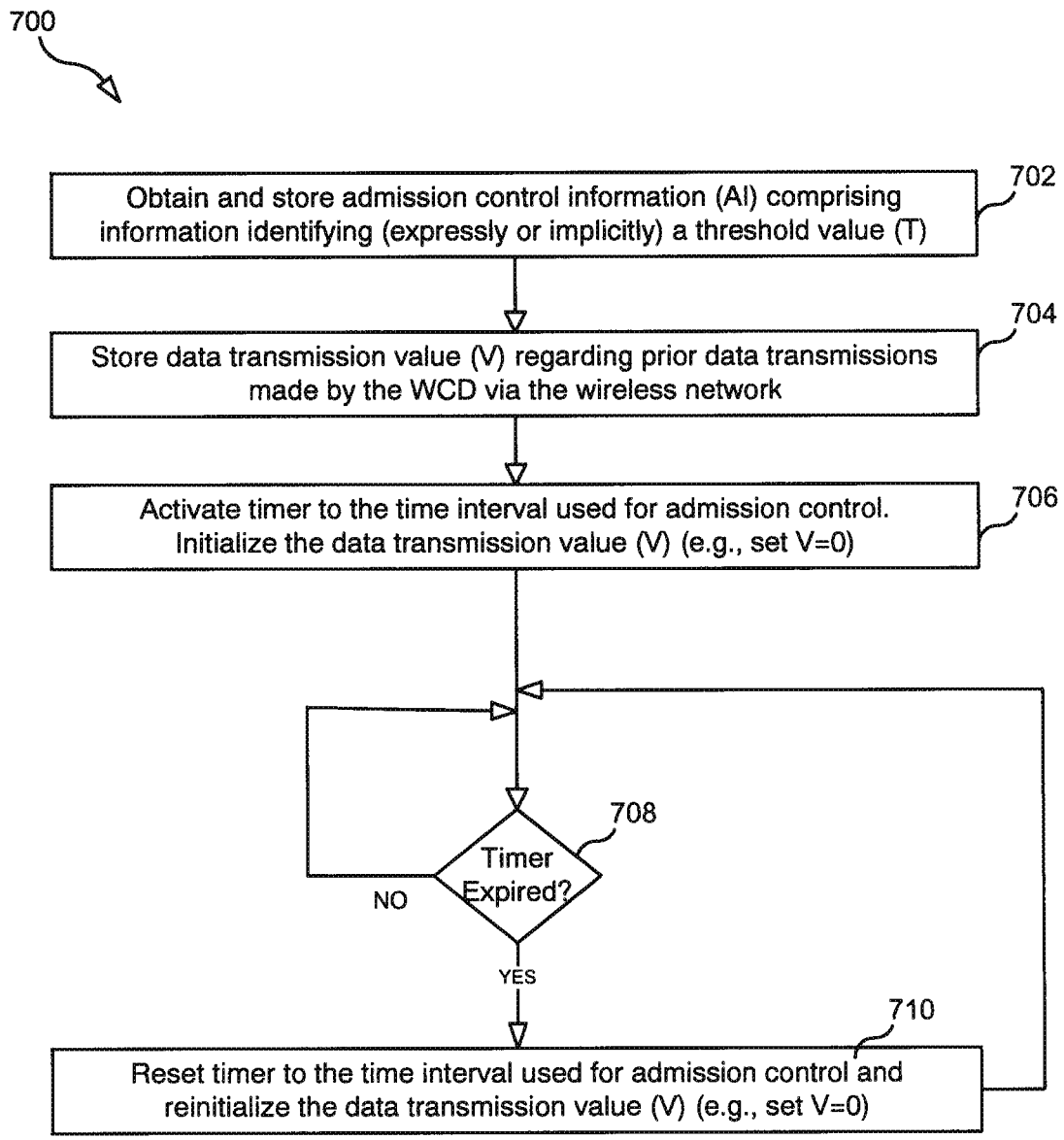
FIG. 7 is a flow chart illustrating a process according to some embodiments.

FIG. 7 is a flow chart illustrating a process 700, according to some embodiments, that is performed by the WCD and/or the CSN.

In step 702, the device (i.e., the WCD or the CSN) obtains and stores admission control information (AI) comprising information identifying (expressly or implicitly) a threshold value (T).

In step 704, the device stores data transmission value (V) regarding prior data transmissions made by the WCD via the wireless network.

In step 706, the device activates a timer to the time interval used for admission control and initializes the data transmission value (V) (e.g., set V=0).

In step 708, the device determines whether the timer has expired.

In step 710, in response to determining that the timer has expired, the device resets the timer to the time interval used for admission control and reinitializes the data transmission value (V) (e.g., set V=0).

Figure 8:
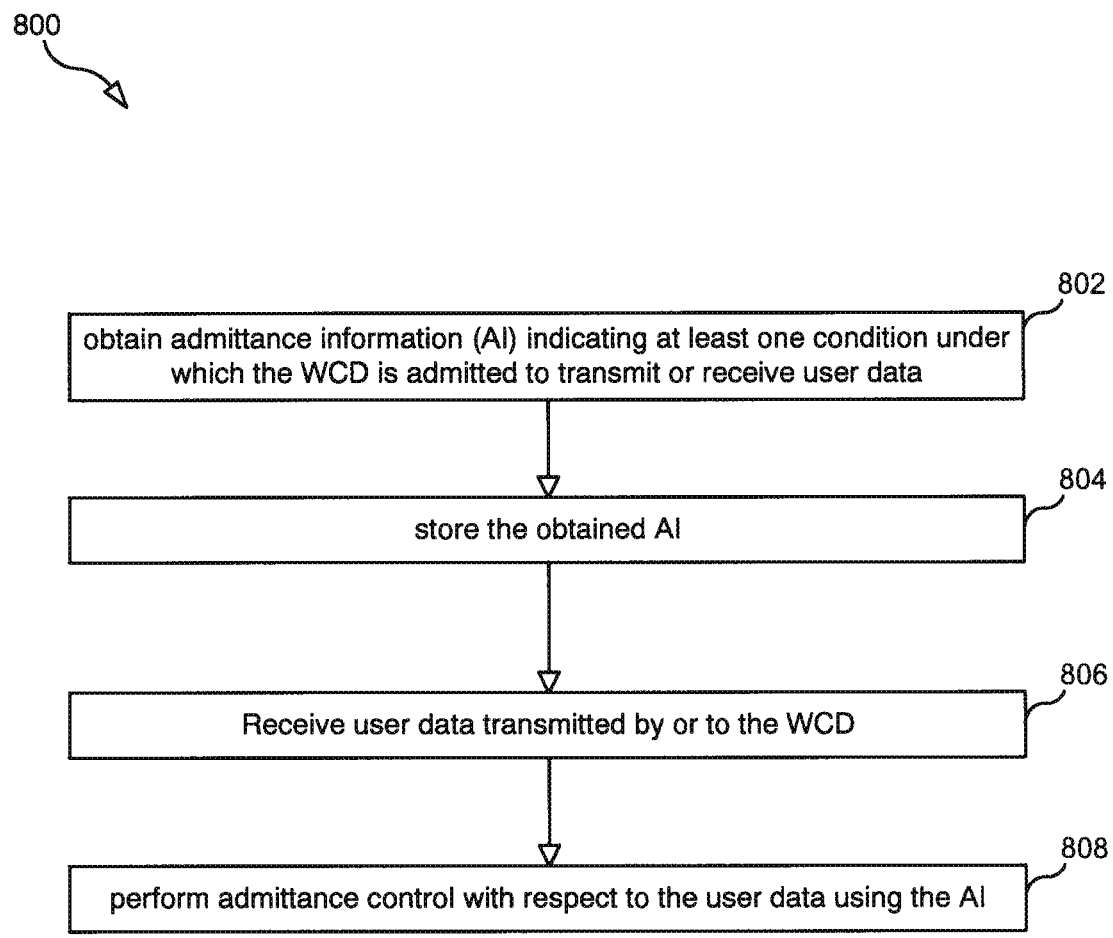
FIG. 8 is a flow chart illustrating a process according to some embodiments.

FIG. 8 is a flow chart illustrating a process 800, according to some embodiments, that is performed by the CSN. In step 802, the CSN obtains admittance information (AI) indicating at least one condition under which the WCD is admitted to transmit or receive user data. In step 804, the CSN stores the obtained AI (e.g., the CSN stores the AI in a data storage system 1012 in the CSN). In step 806, the CSN receives user data transmitted by or to the WCD. In step 808, the CSN performs admittance control with respect to the user data using the AI.

In some embodiments, the CSN also status information related to prior user data transmissions from or to the WCD. In such embodiments, the step of performing admittance control comprises the CSN using the status information to determine whether a traffic threshold identified by the AI has been exceeded. In some embodiments, in response to determining that the traffic threshold has been exceeded, the CSN does one of the following: i) discards the received user data, ii) transmits the user data to the intended recipient and generates a charging event for exceeding the threshold, or iii) transmits the user data to the intended recipient at a later point in time.

Figure 9:
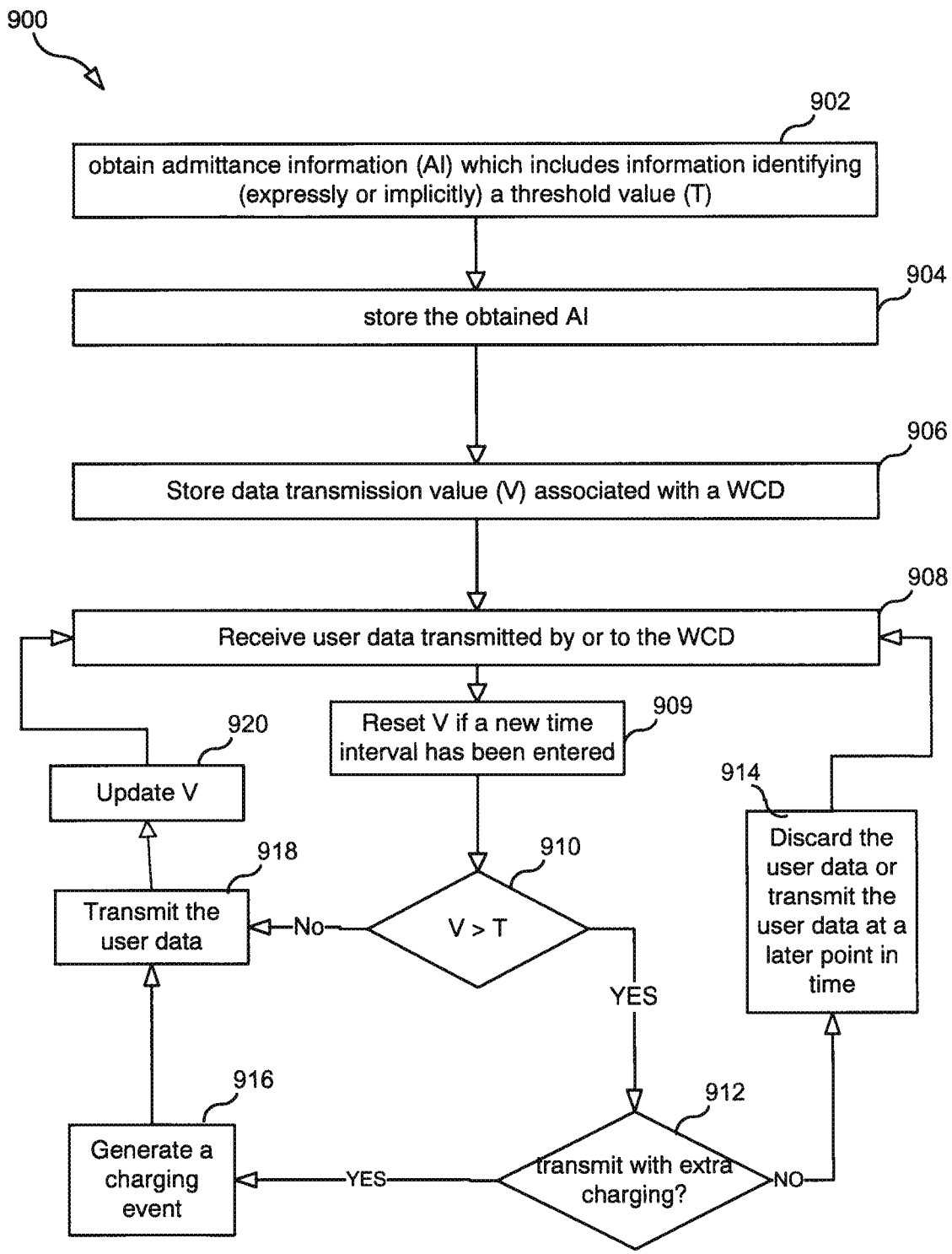
FIG. 9 is a flow chart illustrating a process according to some embodiments.

FIG. 9 is a flow chart illustrating a process 900, according to such embodiments, that is performed by the CSN.

In step 902, the CSN obtains admittance information (AI) which includes information identifying (expressly or implicitly) a threshold value (T) corresponding to a traffic threshold.

In step 904, the CSN stores the obtained AI (e.g., the CSN stores the AI in data storage system 1012).

In step 906, the CSN stores status information associated with a WCD (e.g., the CSN stores the status information in data storage system 1012). In this case, the status information comprises, or consists of, a data transmission value (V) related to prior user data transmission from or to the WCD. In some embodiments, V corresponds to at least one of: i) a number of wireless data transmissions made by the WCD, ii) an amount of data transmitted wirelessly by the WCD, or iii) a number of logical tokens within a logical bucket. For example, in some embodiments, V corresponds to a number of packets transmitted wirelessly by the WCD (e.g., the number packet transmitted with the last hour, other unit of time, or ongoing time interval). As another example, in some embodiments V corresponds to a number of small data messages transmitted wirelessly by the WCD (e.g. V identifies the number of small data messages that the WCD wirelessly transmitted within the last unit of time (e.g., day, hour, etc.) or ongoing time interval).

In step 908, the CSN receives user data transmitted by or to the WCD. In some embodiments, as mentioned above, the WCD transmits the user data by encapsulating it within a control plane message (e.g., a NAS message). Thus, in some embodiments, CSN receives the user data by receiving a control plane message that contains at least a portion of the user data.

In step 909, the CSN resets V if a new time interval has been entered.

In step 910, the CSN compares V with T. More specifically, in this example, the CSN determines if V>T. If V>T is true, then the process proceeds to step 912, otherwise it proceeds to step 918.

In step 912, the CSN determines whether it should transmit the data and generate an extra charge. If not, the process proceeds to step 914, otherwise it proceeds to step 916.

In step 914, the CSN discards the user data or transmits the user data at a later point in time.

In step 916, the CSN generates a charging event and/or stores charging information enabling extra charging.

In step 918, the CSN transmits the user data, and in step 920 updates V. In some embodiments, step 920 is performed before step 910.

In some embodiments, the CSN updates V by increasing V by an amount (in other embodiments it decreases V by the amount). In some embodiments the amount is 1 (e.g., V=V+1). In some embodiments, transmitting the user data consists of transmitting N number of packets or N number of data octets or N number of small data messages, and the amount by which V is increased/decreased is equal to N (e.g., V=V+N). In some embodiments, transmitting the user data comprises the CSN transmitting to the WCD via the BS a control plane message (e.g., a NAS message) comprising at least a portion of the user data.

Figure 10:
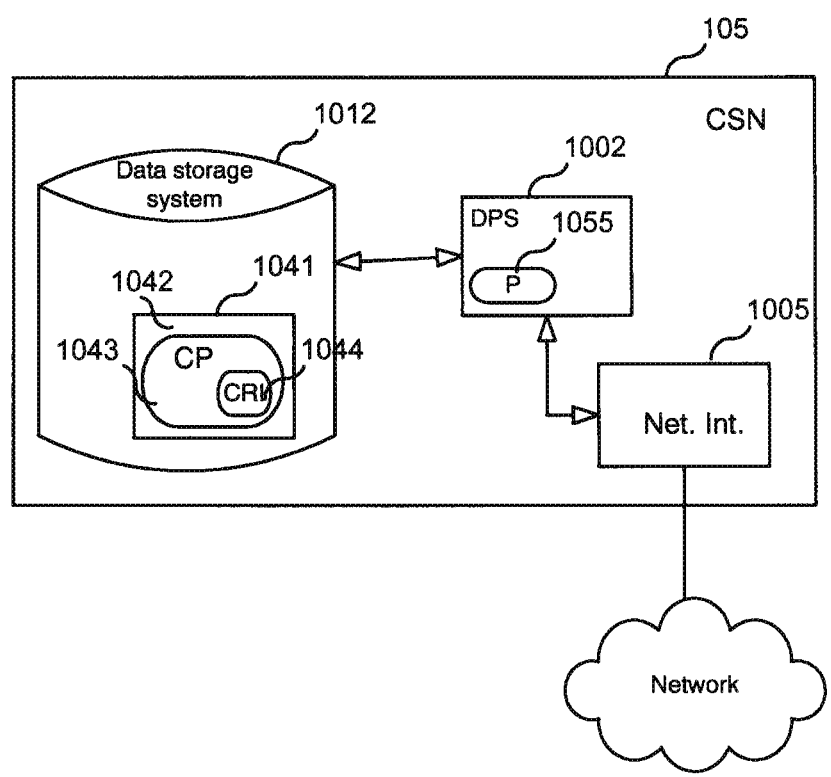
FIG. 10 is a block diagram of a CSN according to some embodiments.

FIG. 10 is a block diagram of an embodiment of CSN 105. As shown in FIG. 10, CSN 105 may include: a data processing system (DPS) 1002, which may include one or more processors 1055 (e.g., a general purpose microprocessor and/or one or more other data processing circuits, such as an application specific integrated circuit (ASIC), field-programmable gate arrays (FPGAs), and the like); a network interface 1005 for use in connecting CSN 105 to a network; and a data storage system 1012 for storing AI, status information and other data, which may include one or more non-volatile storage devices and/or one or more volatile storage devices (e.g., random access memory (RAM)). In embodiments where CSN 105 includes a general purpose microprocessor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, but not limited to, magnetic media (e.g., a hard disk), optical media (e.g., a DVD), memory devices (e.g., random access memory), and the like. In some embodiments, the CRI 1044 of computer program 1043 is configured such that when executed by data processing system 1002, the CRI causes the CSN 105 to perform steps described above (e.g., steps described above with reference to the flow charts). In other embodiments, CSN 105 may be configured to perform steps described herein without the need for code. That is, for example, data processing system 1002 may consist merely of one or more ASICs. Hence, the features of the embodiments described herein may be implemented in hardware and/or software.

Figure 11:
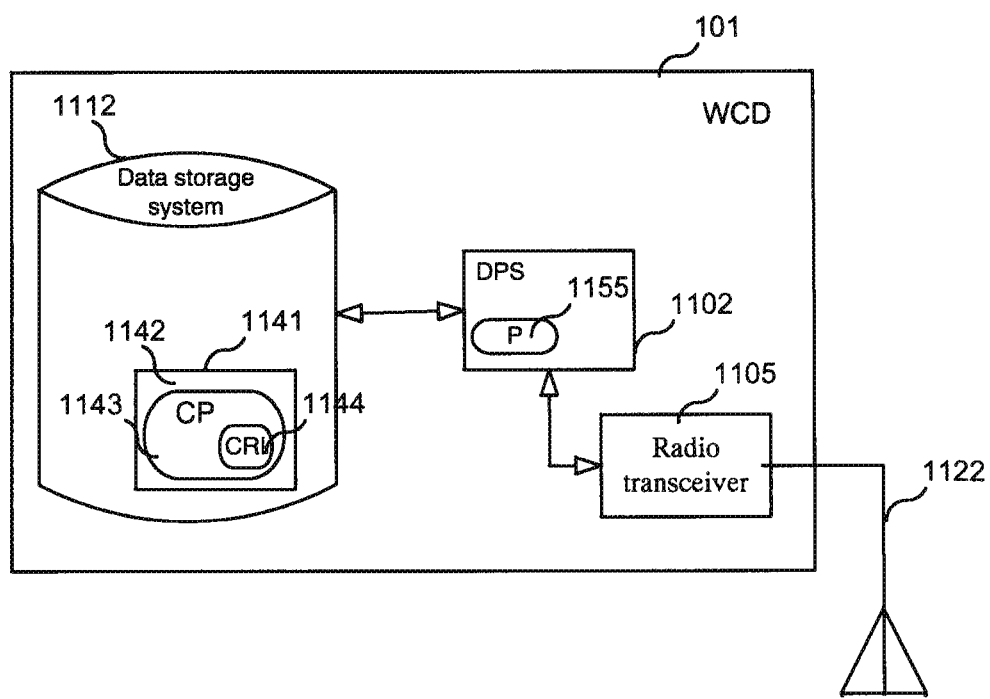
FIG. 11 is a block diagram of a WCD according to some embodiments.

FIG. 11 is a block diagram of an embodiment of WCD 101. As shown in FIG. 11, WCD 101 may include: a data processing system (DPS) 1102, which may include one or more processors 1155 (e.g., a general purpose microprocessor and/or one or more other data processing circuits, such as an application specific integrated circuit (ASIC), field-programmable gate arrays (FPGAs), and the like); a radio transceiver 1105 coupled to an antenna 1122 for use wirelessly transmitting data; and a data storage system 1112 for storing AI, status information and other data, which may include one or more non-volatile storage devices and/or one or more volatile storage devices (e.g., random access memory (RAM)). In embodiments where WCD 101 includes a general purpose microprocessor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, but not limited to, magnetic media (e.g., a hard disk), optical media (e.g., a DVD), memory devices (e.g., random access memory), and the like. In some embodiments, the CRI 1144 of computer program 1143 is configured such that when executed by data processing system 1102, the CRI causes the WCD 101 to perform steps described above (e.g., steps described above with reference to the flow charts). In other embodiments, WCD 101 may be configured to perform steps described herein without the need for code. That is, for example, data processing system 1102 may consist merely of one or more ASICs. Hence, the features of the embodiments described herein may be implemented in hardware and/or software.

Some embodiments described above may be summarized in the following manner:

In one aspect there is provided a first method for regulating user data traffic in a wireless network. In some embodiments, the method includes a wireless communication device (WCD) (e.g., a Cellular Internet of Things (CIoT) device) obtaining admittance information (AI) indicating at least one condition under which the WCD is admitted to transmit user data to a radio access network (RAN) node. The method further includes the WCD initiating the uplink (UL) transmission of user data via the wireless network. The method also includes the WCD performing admittance control with respect to said user data based on the obtained AI.

In some embodiments, the method further includes the WCD storing status information relating to previously transmitted user data. In such an embodiment, the step of performing admittance control with respect to said user data comprises: the WCD using the status information to determine whether the WCD may at this time transmit the user data to the RAN node; and, in response to determining that the WCD may not at this time transmit the user data to the RAN node, the WCD i) discarding the user data or ii) transmitting the user data at a later point in time. In some embodiments, the AI comprises information identifying a threshold value (T), the status information comprises a data transmission value (V) corresponding to at least one of: i) a number of wireless data transmissions made by the WCD, ii) an amount of data transmitted wirelessly by the WCD, or iii) a number of logical tokens within a logical bucket. In some embodiments, the data transmission value (V) corresponds to: a number of packets transmitted wirelessly by the WCD or a number of small data messages transmitted wirelessly by the WCD. In some embodiments, using the status information to determine whether the WCD may at this time transmit the user data to the node via the wireless network comprises comparing the data transmission value (V) with the threshold value (T). In such embodiments, the method further includes updating V as a result of transmitting the user data.

In some embodiments, the method further comprises, at the later point in time, the WCD using the status information to determine whether the WCD may at this time transmit the user data to the node via the wireless network; and in response to determining that the WCD may transmit the user data via the wireless network, the WCD transmitting the user data via the wireless network and the WCD increasing said data transmission value (V). In some embodiments, transmitting the user data via the wireless network consisted of transmitting N number of packets or N number of data octets or N number of small data messages, and increasing said data transmission value consists of increasing said data transmission value by N.

In some embodiments, the step of transmitting the user data via the wireless network comprises transmitting a control plane message comprising at least a portion of the user data.

In some embodiments, the method also includes resetting the data transmission value (V) in response to determining that a new timer interval has been entered.

In some embodiments, the method also includes the WCD transmitting an initial Non-Access Stratus (NAS) message to a network node. In such embodiments, the WCD receives a NAS response message transmitted by a network node as a result of the network node processing the initial NAS message. In such embodiments, the NAS response message comprises said AI, and the WCD obtains said AI from the NAS response message. In some embodiments, the initial Non-Access Stratus (NAS) message is one of an Attach Request message or a Tracking Area Update Request message, and the NAS response message is one of an Attach Accept message or a Tracking Area Update Accept message.

In some embodiments, the method also includes determining whether the user data type is of a certain type, wherein the step of performing admittance control is performed as a result of determining that the user data is of the certain type.

In some embodiments, the step of transmitting the user data at a later point in time comprises one of: a) waiting at least a certain amount of time, and then, after the predetermined amount of time has elapsed, retrying to transmit the user data, b) waiting at least until V has been reset and then transmitting the user data, or c) using a Data Radio Bearer (DRB) to transmit said user data together with other user data that was previously buffered for uplink transmission.

In another aspect there is provided a wireless communication device (WCD) for regulating user data traffic. In some embodiments, the WCD includes a data storage system (DSS); and a data processing system (DPS) coupled to the data storage system. The WCD is configured to: store in the DSS admittance information (AI) indicating at least one condition under which the WCD is admitted to transmit user data to a radio access network (RAN) node; and perform admittance control with respect to said user data based on the obtained AI.

In some embodiments, the WCD is further configured to: store in the DSS status information relating to previously transmitted user data. In such embodiments the WCD is configured to perform admittance control with respect to said user data by: using the status information to determine whether the WCD may transmit the user data to the RAN node; and discarding the user data or transmitting the user data at a later point in time in response to determining that the WCD may not transmit the user data to the RAN node.

In some embodiments, the AI comprises information identifying a threshold value (T) and the status information comprises a data transmission value (V) corresponding to at least one of: i) a number of wireless data transmissions made by the WCD, ii) an amount of data transmitted wirelessly by the WCD, or iii) a number of logical tokens within a logical bucket. In such embodiments, using the status information to determine whether the WCD may transmit the user data to the node via the wireless network comprises comparing the data transmission value (V) with the threshold value (T). In such embodiments, the WCD is further configured to update V as a result of the WCD transmitting the user data. In some embodiments, the data transmission value (V) corresponds to: a number of packets transmitted wirelessly by the WCD or a number of small data messages transmitted wirelessly by the WCD.

In some embodiments, the WCD is further configured to employ a transmitter to transmit an initial Non-Access Stratus (NAS) message to a network node and receive a NAS response message transmitted by the network node as a result of the network node processing the initial NAS message. In some embodiments, the NAS response message comprises said AI, and the WCD obtains said AI from the NAS response message. The initial Non-Access Stratus (NAS) message may be one of an Attach Request message or a Tracking Area Update Request message, and the NAS response message may be one of an Attach Accept message or a Tracking Area Update Accept message.

In some embodiments, the WCD is further configured to determine whether the user data type is of a certain type, wherein the WCD is configured to perform the admittance control with respect to the user data only if the user data is of the certain type.

In another aspect, a second method for regulating user data traffic in a wireless network is provided. In some embodiments, the second method includes a core serving node (CSN) (e.g., MME, SGW, PGW, C-SGN) obtaining admittance information (AI) indicating at least one condition under which the WCD is admitted to transmit or receive user data. The method also includes the CSN storing the obtained AI. The method further includes the CSN receiving user data transmitted by the WCD or transmitted to the WCD by another node, and, in response to receiving the user data, the CSN performing admittance control with respect to the user data using the AI.

In some embodiments, the method further includes the CSN storing status information related to prior user data transmission from or to the WCD. In such embodiments, the step of performing admittance control comprises: the CSN using the status information to determine whether a traffic threshold has been exceeded; and, in response to determining that the traffic threshold has been exceeded, the CSN i) discarding the received user data, or ii) transmitting the user data to the intended recipient and generating a charging event for exceeding the threshold, or iii) transmitting the user data to the intended recipient at a later point in time.

In some embodiments, the AI comprises information identifying a threshold value (T) corresponding to the traffic threshold, and the status information comprises a data transmission value (V) corresponding to at least one of: i) a number of wireless data transmissions made by the WCD, ii) an amount of data transmitted wirelessly by the WCD, or iii) a number of logical tokens within a logical bucket. In such embodiments, using the status information to determine whether the traffic threshold has been exceeded comprises comparing the data transmission value (V) with the threshold value (T).

In some embodiments, the data transmission value (V) corresponds to: a number of packets transmitted wirelessly by the WCD or a number of small data messages transmitted wirelessly by the WCD.

In some embodiments, the method further includes the CSN receiving via the RAN second user data transmitted by the WCD, the CSN using the status information to determine whether a traffic threshold has been exceeded in response to receiving the second user data; and the CSN forwarding the second user data to another node and increasing said data transmission value (V) in response to determining the traffic threshold has not been exceeded. In some embodiments, the step of receiving said second user data comprises receiving: N number of packets or N number of data octets or N number of small data messages, and the step of increasing said data transmission value consists of increasing said data transmission value by N.

In some embodiments, the method further includes resetting the data transmission value in response to determining that a new timer interval has been entered.

In some embodiments, the step of receiving the user data comprises receiving a control plane message (e.g., a NAS message) comprising at least a portion of the user data.

In some embodiments, the method further includes the CSN receiving an initial NAS message transmitted by one of the WCDs. In such embodiments the method further includes the CSN transmitting an AI request to a subscriber server in response to the initial NAS message and the CSN, after transmitting the AI request, receiving said AI from the subscriber server. The method further includes the CSN storing the AI and transmitting the AI to the WCD as part of a NAS response to the initial NAS message.

In some embodiments, the method further includes the CSN receiving downlink user data addressed to the WCD. In such embodiments, the CSN uses the AI and status information to determine whether a traffic threshold has been exceeded in response to receiving the downlink user data. In response to determining that the traffic threshold has been exceeded, the CSN may either i) discard the received downlink user data or ii) transmit the downlink user data to the WCD and generate a charging event for exceeding the threshold.

In another aspect, a core serving node (CSN) for regulating user data traffic is provided. The CSN includes a network interface, a data storage system (DSS); and a data processing system (DPS) coupled to the network interface and the DSS. The CSN is configured to obtain admittance information (AI) indicating at least one condition under which the WCD is admitted to transmit or receive user data, store the obtained AI, receive user data transmitted by the WCD or transmitted to the WCD by another node, and perform admittance control with respect to the user data using the AI in response to receiving the user data.

In some embodiments, the CSN is further configured to store status information related to prior user data transmission from or to the WCD. In such embodiments, the CSN performs the admittance control by: using the status information to determine whether a traffic threshold has been exceeded, and i) discarding the received user data, or ii) transmitting the user data to the intended recipient and generating a charging event for exceeding the threshold, or iii) transmitting the user data to the intended recipient at a later point in time in response to determining that the traffic threshold has been exceeded.

In some embodiments, the AI comprises information identifying a threshold value (T) corresponding to the traffic threshold and the status information comprises a data transmission value (V) corresponding to at least one of: i) a number of wireless data transmissions made by the WCD, ii) an amount of data transmitted wirelessly by the WCD or iii) a number of logical tokens within a logical bucket. In such embodiments, the CSN is configured to use the AI and the status information to determine whether the traffic threshold has been exceeded by comparing the data transmission value (V) with the threshold value (T).

In some embodiments, the data transmission value (V) corresponds to: a number of packets transmitted wirelessly by the WCD or a number of small data messages transmitted wirelessly by the WCD.

In some embodiments, the CSN is further operable to receive via the RAN second user data transmitted by the WCD. In response to receiving the second user data, the CSN uses the AI and the status information to determine whether a traffic threshold has been exceeded. In response to determining the traffic threshold has not been exceeded, the CSN forwards the second user data to another node and increases said data transmission value (V).

In some embodiments, the CSN is further operable to receive an initial NAS message transmitted by one of the WCDs. The CSN transmits an AI request to a subscriber server in response to the initial NAS message. The CSN receives said AI from the subscriber server after transmitting the AI request. The CSN stores the AI after receiving the AI from the subscriber server. The CSN transmits the AI to the WCD as part of a NAS response to the initial NAS message.

In some embodiments, the CSN is further operable to receive downlink user data addressed to the WCD. The CSN uses the AI and status information to determine whether a traffic threshold has been exceeded in response to receiving the downlink user data. Also, the CSN either i) discards the received downlink user data or ii) transmits the downlink user data to the WCD and generates a charging event for exceeding the threshold in response to determining that the traffic threshold has been exceeded.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for regulating user data traffic in a control plane of a wireless network, the method comprising:
   a wireless communication device (WCD) receiving rate control information (RCI) that was transmitted towards the WCD by a core network node serving the WCD, the RCI indicating a threshold value (T) for use by the WCD in limiting the rate at which the WCD generates uplink (UL) Non-Access Stratum (NAS) Data messages, the threshold value indicating a maximum number of NAS Data messages per unit of time that the WCD is admitted to transmit, wherein each NAS Data message is a NAS message comprising user data; and
   based on the received threshold value (T) that was transmitted towards the WCD by a core network node serving the WCD, the WCD limiting the rate at which the WCD generates UL NAS Data messages.

2. The method of claim 1, further comprising:
   the WCD storing status information relating to previously transmitted NAS Data messages, wherein
   the step of limiting the rate at which the WCD generates UL NAS Data messages comprises:

the WCD using the status information to determine whether the WCD may at this time transmit a NAS Data message to the RAN node; and in response to determining that the WCD may not at this time transmit the NAS Data message to the RAN node, the WCD i) discarding the user data included in the NAS Data message or ii) transmitting said user data at a later point in time.

3. The method of claim 2, wherein transmitting the user data at a later point in time comprises waiting at least a certain amount of time, and then, after the amount of time has elapsed, retrying to transmit the user data.

4. The method of claim 2, wherein transmitting the user data at a later point in time comprises using a Data Radio Bearer (DRB) to transmit said user data together with other user data that was previously buffered for uplink transmission.

5. The method of claim 2, wherein transmitting the user data at a later point in time comprises one of:
  a) waiting at least a certain amount of time, and then, after the amount of time has elapsed, retrying to transmit the user data,
  b) waiting at least until V has been reset and then transmitting the user data, or
  c) using a Data Radio Bearer (DRB) to transmit said user data together with other user data that was previously buffered for uplink transmission.

6. The method of claim 2, wherein
the status information comprises a data transmission value (V) corresponding to a number of NAS Data messages that the WCD previously transmitted,
using the status information to determine whether the WCD may at this time transmit the NAS Data message comprises comparing the data transmission value (V) with the threshold value (T), and
the method further comprising updating the data transmission value V as a result of transmitting the NAS Data message.

7. The method of claim 6, further comprising:
at the later point in time, the WCD using the status information to determine whether the WCD may at this time transmit a second NAS Data message to the node via the wireless network; and
in response to determining that the WCD may transmit the second NAS Data message via the wireless network, the WCD transmitting the second NAS Data message via the wireless network and the WCD increasing said data transmission value (V).

8. The method of claim 6, further comprising resetting the data transmission value (V) in response to determining that a new timer interval has been entered.

9. The method of claim 1, further comprising:
the WCD transmitting an initial NAS message to a network node; and
the WCD receiving a NAS response message transmitted by a network node to the WCD as a result of the network node processing the initial NAS message, wherein
the NAS response message transmitted by the network node to the WCD as a result of the network node processing the initial NAS message comprises said RCI, and
the WCD obtains said RCI from the NAS response message, wherein
the initial NAS message is one of an Attach Request message or a Tracking Area Update Request message, and
the NAS response message is one of an Attach Accept message or a Tracking Area Update Accept message.

10. The method of claim 1, wherein the WCD is a Cellular Internet of Things (CIoT) device.

11. A wireless communication device (WCD) for regulating user data traffic, the WCD comprising:
a data storage system (DSS); and
a data processing system (DPS) coupled to the data storage system, wherein
the WCD is configured to:
store in the DSS rate control information (RCI) received from a core network node, the RCI indicating a threshold value (T) for use by the WCD in limiting the rate at which the WCD generates uplink (UL) Non-Access Stratum (NAS) Data messages, the threshold value indicating a maximum number of NAS Data messages per unit of time that the WCD is admitted to transmit, wherein each NAS Data message is a NAS message comprising user data; and
based on the received threshold value, limit the rate at which the WCD generates UL NAS Data messages.

12. The WCD of claim 11, wherein the WCD is further configured to:
store in the DSS status information relating to previously transmitted NAS Data messages, wherein
the WCD is configured to limit the rate at which the WCD generates UL NAS Data messages by performing a process comprising:
using the status information to determine whether the WCD may at this time transmit a NAS Data message; and
discard the user data included in the NAS Data message or transmit said user data at a later point in time in response to determining that the WCD may not at this time transmit the NAS Data message.

13. The WCD of claim 12, wherein
the status information comprises a data transmission value (V) corresponding to a number of NAS Data messages that the WCD previously transmitted,
using the status information to determine whether the WCD may transmit the NAS Data message comprises comparing the data transmission value (V) with the threshold value (T), and
the WCD is further configured to update V as a result of the WCD transmitting the NAS Data message.

14. The WCD of claim 13, wherein the data transmission value (V) corresponds to: a number of packets transmitted wirelessly by the WCD or a number of small data messages transmitted wirelessly by the WCD.

15. The WCD of claim 11, wherein the WCD is further configured to:
employ a transmitter to transmit an initial NAS message to a network node; and
receive a NAS response message transmitted by the network node to the WCD as a result of the network node processing the initial NAS message, wherein
the NAS response message transmitted by the network node to the WCD comprises said RCI, and
the WCD obtains said RCI from the NAS response message, wherein
the initial Non-Access Stratus (NAS) message is one of an Attach Request message or a Tracking Area Update Request message, and
the NAS response message is one of an Attach Accept message or a Tracking Area Update Accept message.

16. A method for regulating user data traffic in a wireless network, the method comprising:

a core serving node (CSN) obtaining admittance information (AI) indicating a threshold value for use in regulating Non-Access Stratum (NAS) traffic transmitted by a wireless communication device (WCD) or addressed to the WCD, the threshold value representing a maximum number of NAS Data messages per unit of time that the WCD is admitted to transmit or receive, wherein each NAS Data message is a NAS message comprising user data;

the CSN storing the obtained AI;

the CSN receiving a NAS Data message transmitted by the WCD or transmitted to the WCD by another node; and in response to receiving the NAS Data message, the CSN performing admission control for regulating the received NAS Data message using the obtained threshold value.

17. The method of claim 16, further comprising, the CSN storing status information related to prior user data transmissions from or to the WCD, wherein the step of performing admission control comprises:

the CSN using the status information to determine whether the threshold value has been exceeded; and in response to determining that the threshold value has been exceeded, the CSN i) discarding the user data included in the received NAS Data message, or ii) transmitting the NAS Data message to the intended recipient and generating a charging event, or iii) transmitting the user data to the intended recipient at a later point in time.

18. The method of claim 16, wherein the NAS Data message was transmitted to the CSN by the WCD, the status information comprises a data transmission value (V) corresponding to a number of NAS Data messages that the WCD previously transmitted, and using the status information to determine whether the threshold value has been exceeded comprises comparing the data transmission value (V) with the threshold value (T).

19. The method of claim 18, further comprising:

the CSN receiving via the RAN a second NAS Data message transmitted by the WCD;

in response to receiving the second NAS Data message, the CSN using the status information to determine whether the threshold value has been exceeded; and in response to determining the threshold value has not been exceeded, the CSN forwarding the second NAS Data message to another node and increasing said data transmission value (V).

20. The method of claim 18, further comprising resetting the data transmission value in response to determining that a new timer interval has been entered.

21. The method of claim 16, further comprising:

the CSN receiving an initial NAS message transmitted by the WCD;

the CSN, in response to the initial NAS message, transmitting an AI request to a subscriber server;

the CSN, after transmitting the AI request, receiving said AI from the subscriber server;

the CSN, after receiving the AI from the subscriber server, storing the AI; and the CSN, in response to the initial NAS message, transmitting the AI to the WCD as part of a NAS response to the initial NAS message.

22. The method of claim 16, further comprising:

the CSN receiving a downlink NAS Data message addressed to the WCD;

in response to receiving the downlink NAS Data message, the CSN using status information to determine whether the threshold value has been exceeded; and in response to determining that the threshold value has been exceeded, the CSN either i) discarding the user data included in the NAS Data message or ii) transmitting the downlink NAS Data message to the WCD and generating a charging event.

23. A core serving node (CSN) for regulating user data traffic, the CSN comprising:

a network interface;

a data storage system (DSS); and a data processing system (DPS) coupled to the network interface and the DSS, wherein the CSN is configured to:

obtain admittance information (AI) indicating a threshold value for use in regulating Non-Access Stratum (NAS) traffic transmitted by a wireless communication device (WCD) or addressed to the WCD, the threshold value representing a maximum number of NAS Data messages per unit of time that the WCD is admitted to transmit or receive, wherein each NAS Data message is a NAS message comprising user data;

store the obtained AI;

receive a NAS Data message transmitted by the WCD or transmitted to the WCD by another node; and in response to receiving the NAS Data message, perform admission control for regulating the received NAS Data message using the obtained threshold value.

24. The method of claim 23, wherein the CSN is further configured to store status information related to prior user data transmissions from or to the WCD, wherein the CSN performs the admission control by:

using the status information to determine whether the threshold value has been exceeded; and in response to determining that the threshold value has been exceeded, i) discarding the user data included in the received NAS Data message, or ii) transmitting the NAS Data message to the intended recipient and generating a charging event, or iii) transmitting the user data to the intended recipient at a later point in time.

25. The method of claim 23, wherein the status information comprises a data transmission value (V) corresponding to a number of NAS Data messages that the WCD previously transmitted, and the CSN is configured to use the status information to determine whether the threshold value has been exceeded by comparing the data transmission value (V) with the threshold value (T).

26. The method of claim 25, wherein the CSN is further operable to:

receive via the RAN a second NAS Data message (NDM) transmitted by the WCD;

in response to receiving the second NDM, use the AI and the status information to determine whether the threshold value has been exceeded; and in response to determining the threshold value has not been exceeded, forward the second NDM to another node and increasing said data transmission value (V).

27. The method of claim 23, wherein the CSN is further operable to:

receive an initial NAS message transmitted by the WCD;

transmit an AI request to a subscriber server in response to the initial NAS message;

receive said AI from the subscriber server after transmitting the AI request;

store the AI after receiving the AI from the subscriber server; and transmit the AI to the WCD as part of a NAS response to the initial NAS message.

28. The method of claim 23, wherein the CSN is further operable to:

receive a downlink NAS Data message (NDM) addressed to the WCD;

use the AI and status information to determine whether the threshold value has been exceeded in response to receiving the downlink NDM; and in response to determining that the threshold value has been exceeded either i) discarding the user data included in the downlink NDM or ii) transmitting the downlink NDM to the WCD and generating a charging event.

* * * * *

UNITED STATES PATENT AND TRADEMARK OFFICE
CERTIFICATE OF CORRECTION

PATENT NO. : 10,805,830 B2  
APPLICATION NO. : 14/826899  
DATED : October 13, 2020  
INVENTOR(S) : Hans Bertil Rönneke Page 1 of 1

It is certified that error appears in the above-identified patent and that said Letters Patent is hereby corrected as shown below:

On the Title Page

On Page 2, item (56), under "OTHER PUBLICATIONS", in Column 1, Line 3, delete "Partnrship" and insert -- Partnership --, therefor.

In the Specification

In Column 4, Line 66, delete "can based" and insert -- can be based --, therefor.

In Column 5, Line 40, delete "able" and insert -- able to --, therefor.

In Column 7, Line 36, delete "toke" and insert -- token --, therefor.

In Column 13, Line 16, delete "Non-Access Stratus" and insert -- Non-Access Stratum --, therefor.

In Column 13, Line 23, delete "Non-Access Stratus" and insert -- Non-Access Stratum --, therefor.

In Column 14, Lines 9-10, delete "Non-Access Stratus" and insert -- Non-Access Stratum --, therefor.

In Column 14, Line 15, delete "Non-Access Stratus" and insert -- Non-Access Stratum --, therefor.

In the Claims

In Column 18, Line 61, in Claim 15, delete "Non-Access Stratus" and insert -- Non-Access Stratum --, therefor.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*